Figure 1:
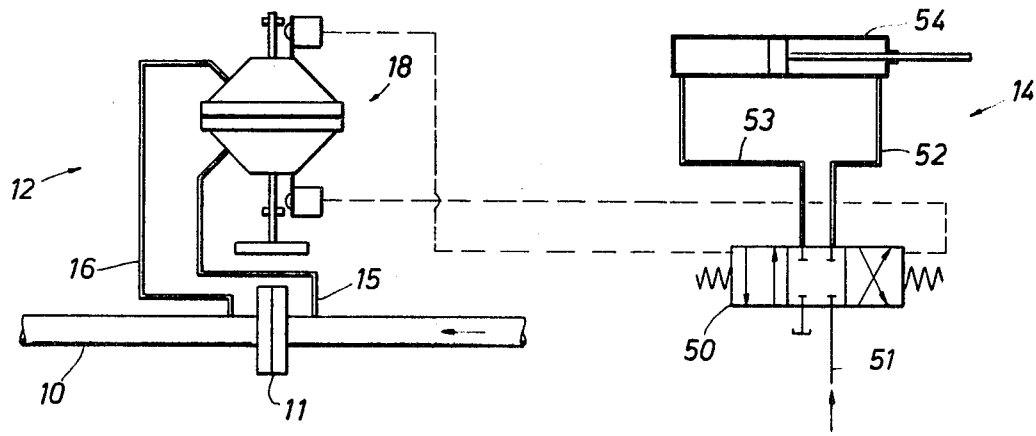

United States Patent

[11] 3,626,982

| [72] | Inventors | Thomas F. McDuffie<br>11926 Taylor-Crest, Houston, Tex. 77024;<br>Neal G. Smith, 143 Ravenhead, Houston,<br>Tex. 77034 |
|---|---|---|
| [21] | Appl. No. | 17,602 |
| [22] | Filed | Mar. 9, 1970 |
| [45] | Patented | Dec. 14, 1971 |

[54] FLUIDIC CONTROL DEVICE
7 Claims, 2 Drawing Figs.

[52] U.S. Cl. ..................................................... 137/625.61,
91/3, 137/83
[51] Int. Cl. ...................................................... F16k 11/02
[50] Field of Search ............................................ 137/83,
485, 486, 625.61; 91/3

[56] References Cited
UNITED STATES PATENTS

| 2,193,240 | 3/1940 | Schmidt | 137/83 X |
| 2,251,729 | 8/1941 | Bach | 91/3 |
| 2,312,464 | 3/1943 | Ziebolz | 137/485 X |
| 2,339,024 | 1/1944 | Markson | 137/485 X |
| 2,345,524 | 3/1944 | Ziebolz | 137/486 |

*Primary Examiner*—Henry T. Klinksiek
*Attorney*—Donald Gunn

ABSTRACT: For use in controlling fluid pressure, two pressure sources, one being connected with the pressure to be controlled and the other connected with a known pressure, the two pressures being applied to the opposite sides of a relatively large diaphragm which deflects in response to pressure variations, there being a thin rodlike member secured to the diaphragm and extending therefrom, the thin rodlike member carrying a pair of deflectors in proximity of jets from fluidic devices which note the presence or absence thereof, the fluidic devices being connected with a control system for operation in response to movement of the diaphragm.

PATENTED DEC 14 1971                                              3,826,982

Neal G. Smith
Thomas F. McDuffie
INVENTORS

BY  Donald Gunn
ATTORNEY

FLUIDIC CONTROL DEVICE

SUMMARY OF PROBLEM AND SOLUTION

It is sometimes difficult to obtain a pressure differential setting which is accurately controlled when dealing with very large pressures. For instance, a pipeline may have a pressure of approximately 1,000 p.s.i. It may be necessary to tap off a certain flow of gas from the pipeline at exactly 800 p.s.i. the pipeline is tapped with a side line which includes an orifice plate. Ostensibly, the drop across the orifice plate will provide 800 p.s.i. A control valve upstream of the orifice plate may further aid in obtaining the desired 800 p.s.i. The pressure in the pipeline will vary depending in the load, temperature of the gas, and numerous other factors. As these variations are reflected in the pipeline pressure, the apparatus of the present invention regulates the pressure drop to obtain the precisely defined 800 p.s.i. pressure desired.

In other circumstances, it may be desirable to install the present invention to obtain a precisely defined pressure drop. In any case, the present invention is summarized as including a substantially large diaphragm in a housing exposed to two pressure levels. One side of the housing is communicated with the desired pressure level. The other is communicated with the variable pressure to be regulated. A thin member is connected with the diaphragm and forms fluidic signals indicating the location of the diaphragm. As the diaphragm moves, the jets of certain fluidic devices are interrupted. This interruption forms a fluidic signal for connection with control apparatus which regulates pressure upstream of the sensing equipment.

Figure 2:
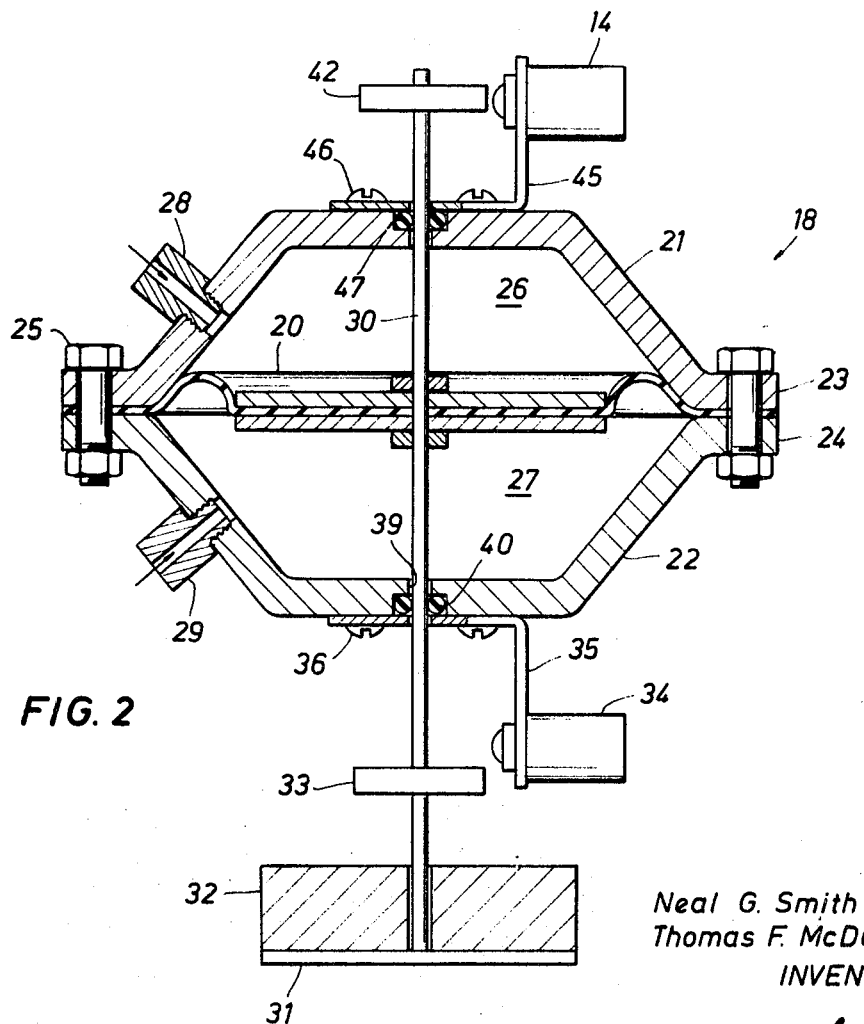

Many objects and advantages of the present invention will become more readily apparent from a consideration of the following specification and drawings, which are:

FIG. 1 is a systems diagram showing the present invention installed with a pipeline for controlling the pressure drop across an orifice in the pipeline; and, FIG. 2 is an enlarged sectional view of the diaphragm of the present invention, the drawing further illustrating the relationship of the diaphragm to the fluidic jets.

In the drawings, attention is first directed to the pipeline 10 indicated in FIG. 1. The pipeline 10 includes an orifice plate 11 which drops the pressure by a predetermined amount. The pressure-differential-sensing apparatus of the present invention is indicated generally by the numeral 12 and is connected with upstream control equipment indicated generally at 14. The control equipment may take any form responsive to the signals herein formed. The control means 14 opens or closes a valve, speeds up a pump, or implements such other steps as are necessary to increase or decrease the pressure in the pipeline 10. It is controlled by the pressure differential device of the present invention.

In FIG. 1, a pilot line 15 is connected upstream of the orifice plate at 11. An additional pilot line 16 is connected downstream of the orifice 11. The lines 15 and 16 are connected with a closed housing indicated generally at 18. The higher pressure in the pilot line 15 is applied to the lower side of the housing 18 for reasons to be described. The lower pressure in the line 16 is applied to the upper face. The diaphragm within the housing is deflected in the manner to be described hereinbelow, its movements being in proportion to the pressure differential acting thereon.

Attention is next directed to FIG. 2 of the drawings where the means 18 is shown in greater detail. In FIG. 2, the numeral 20 indicates a substantially large movable diaphragm. The diaphragm 20 has a relatively large area, perhaps as much as 100 to 200 square inches. The diaphragm 20 is received within a housing which is defined by an upper housing member 21 and a lower housing member 22. The members 21 and 22 are readily made symmetrical in the illustrated embodiment of the present invention. The diaphragm 20 is pinched or held between flanges of the housing members 21 and 22. The flanges are indicated at 23 and 24, respectively, and are joined together by suitable nuts and bolts indicated at 25. This defines two separate chambers which are not communicated with one another within the housing 18. More particularly, an upper chamber 26 is formed above the diaphragm and a lower chamber 27 is formed below the diaphragm. The two chambers are thus communicated with the pilot supply lines 15 and 16 as will be described hereinafter.

The upper housing member 21 has an opening which is fitted with a supply line fitting at 28. The fitting 28 is adapted to be connected with the pilot line 16. Additionally, the lower housing member 22 has its own opening with a threaded fitting 29 providing suitable connection with the conduit or supply line 15. Pressure fluid from the lines 15 and 16 is introduced into the housing 18 to move or deflect the diaphragm 20, and logically, the number of leaks or possible escape routes of the fluid are held to a minimum.

The diaphragm 20 is joined to a thin metal rod 30. The metal rod 30 is so small as to approximate a small piece of wire. Its diameter is quite small in comparison with the diaphragm, the cross section area of the wire being only a mere fraction of the diaphragm surface area. For instance, the ratio might be 5,000 or greater between the two areas. As shown in FIG. 2, the thin rodlike member 30 passes through both housings 21 and 22. It is substantially longer than the housing means 18 is tall, as shown in FIG. 2. The lower end is connected to a support washer 31 of sufficient diameter to receive a weight 32. The weight 32 pulls on the rod 30 and deflects the diaphragm downwardly. A predetermined weight supported at the lower end of the rod 30 provides an offset or bias to the position of the diaphragm. The amount of weight can be varied, and indeed, can be eliminated in some installations. More will be noted in describing the operation of the present invention hereinafter.

The weight 32 is carried on the washer 31 at the lower end of the rod. Immediately thereabove is a condition marker or indicator bearing the reference numeral 33. A fluidic position sensor 34 is positioned immediately adjacent the indicator 33. The sensor 34 is a bought device which forms a pneumatic jet directed toward the rod 30. When the marker or indicator 33 interrupts the jet, the fluidic sensor 34 responds to its presence. When the marker or indicator does not interrupt the jet as might be the case in FIG. 2, a different indication is formed. The pneumatic sensor is a binary device; that is, it forms two signals, the signals indicating the presence or absence of the indicator 33. The pneumatic sensor 34 is carried on a support bracket 35 which is bolted at 36 to the lower face of the housing member 22.

The rod 30 passes through a small opening 39 in the lower housing member 22. A recessed opening receives a suitable O-ring 40 which seals around the rod 30. The O-ring is preferably somewhat loose on the rod 30. This may entail small leakage along the rod 30 as it passes through the housing 22, but this is of no particular concern inasmuch as the rate of leakage is very small in comparison with the substantial volume of the housing or chamber 27 and the rate of inflow. The O-ring 40 slightly contacts the rod 30, but does not fit too snugly or hold the rod 30 too firmly.

It will be noted that the rod 30 extends from both the top and bottom of the housing means 18. The rod 30 carries the weight 32 at its lower end as previously described. Additionally, the upper end carries a marker or indicator 42. The marker 42 is positioned immediately adjacent to a pneumatic position sensor 44 which is similar to or identical with the sensor 34. The sensor 44 is carried on a mounting bracket 45 which is bolted at 46 to the generally hemispherical or domed housing member 21. Again, the rod 30 is sealed by an O-ring 47 to hold the leakage past the rod to a minimum.

The marker or indicator 42 responds to movement of the diaphragm 20. Thus, if the diaphragm deflects upwardly, the marker 42 is carried upwardly. Its position with respect to the air jet of the sensor 44 either interrupts or does not interrupt the air jet. Hence, the pneumatic sensor 44 forms a binary signal indicating the presence or absence of the marker 42. The sensors 34 and 44 are thus position indicators which respond to movement of the diaphragm when considered jointly. There is a certain null range for the diaphragm which indicates it is being operated at a predetermined level of deflection. When it moves from this null range or position, either the marker 42 or the marker 33 causes pneumatic binary signals to be formed indicating this deflection. Consequently, pneumatic signals are formed which will be implemented by the control means 14 to be described hereinafter for controlling or regulating the pressure flow in the pipeline 10 and hence, the drop across the orifice 11.

In FIG. 1, the numeral 50 indicates a three-way spool valve which is returned to a neutral or null position by spring-loaded bias means. The pneumatic signals from the sensors 34 and 44 are used to move the spool to the right or the left as shown in FIG. 2. A source of pressure fluid at 51 is communicated through the spool valve 50 and to a control line 52. In the position of FIG. 2, fluid flow is blocked and the control line 52 does not receive any pressure fluid from the line 51. An additional line is provided at 53. The lines 52 and 53 communicate with opposite ends of the double-acting piston and cylinder arrangement at 54 which is a valve position controller. The valve is not shown in the drawings for sake of clarity. The valve controller 54 opens or closes the valve in a measured amount. The valve is incorporated in the pipeline 10 in some form or fashion to increase or decrease the fluid flow through the pipeline. Variations in the rate of supply will cause variations in the pressure of the pipeline 10. Such variations are thus observed by the present apparatus and the valve controller 54 is operated to obtain the predetermined pressure drop from the orifice.

It will be understood that the valve controller means 14 may be located some distance from the sensing apparatus 18. As a matter of fact, through the use of telemetry equipment, the distance may be several miles, or even hundreds of miles. In any event, the valve controller means 14 is made responsive to the two binary signals from the pressure differential sensor means 12 of the present invention.

There are two especially advantageous ways of using the present invention. The first manner of using the present invention is to provide a controlled pressure drop across the orifice as illustrated in the preferred embodiment. It will be noted that the weight 32 is placed on the lower end of the rod 30. This deflects the diaphragm 20 without regard to the pressures acting on the two faces of the diaphragm. Moreover, the amount of weight is approximately proportionally related to the displacement of the diaphragm. A certain amount of weight on the lower end of the rod 30 corresponds to a predetermined pressure drop. If the amount of weight is kept minimum and only the weight of the rod itself acts on the diaphragm, a small pressure drop across the orifice will be determined. Hence, the apparatus provides a controlled or differential drop which is precisely regulated and which is dependent on the weight of the rod 30 and the weights which are added at the lower end.

Another way of using the present invention is to achieve a determined or desired pressure. Assume, for sake of discussion, that it is desirable to have exactly 800 p.s.i. pressure in the pipeline 10 downstream of a control valve. The line 16 is connected with the pipeline 10 in the illustrated manner. The line 15 is connected with a well-regulated source of pressure, perhaps 850 p.s.i. The weight on the rod is altered to the extent necessary to precisely regulate the pipeline pressure at 800 p.s.i. through the upstream operation of the control equipment at 14 and the control valve.

In operation, it will be noted that the housing means 18 best illustrated in FIG. 2 encompasses a substantial volume. If the volume is too large, response time is decreased. If the volume is too small, leakage along the rod 30 becomes noticeable. These factors can be balanced depending on the response time required. In the preferred embodiment, the significant size ratio to be kept in mind is the ratio of the rod 30 to he diaphragm which approximates 1,000 to 5,000 times the cross-sectional area of the rod.

The arrangement of FIG. 1 might be modified to incorporate the apparatus 12 of the present invention in a servo or closed loop, By way of example, the means 54 shown in FIG. 1 can be used as a valve operator to control the position of a plug or ball valve in the pipeline 10. The opposite sides of the diaphragm 20 can then be connected with a control or set point pressure, and the other side may be connected to a Wilkerson "dial air" or similar position indicator connected with the plug or ball valve. Other arrangements in which the apparatus is incorporated in a servo loop may be readily apparent in like manner.

The terminology adapted in the specification is applied to the claims which are appended hereto.

What is claimed is:

1. Pressure-responsive control apparatus comprising: pressure-sensing means; a movable member operatively associated with said pressure-sensing means and adapted for movement between spaced positions along a predetermined path in response to pressure variations sensed by said pressure-sensing means; control means including pressure-responsive actuating means adapted to be operated in response to the application of a pressured control fluid thereto, and a pneumatically actuated control valve fluidly coupled to said actuating means and adapted for selectively regulating the supply of a pressured control fluid thereto in response to the transmission of pneumatic signals to said control valve; and pneumatic-signaling means including fluidic jet means adapted to direct a pneumatic jet across said predetermined path of said movable member for providing a first pneumatic signal when said movable member is in a first one of its said positions and impinged by a pneumatic jet issuing from said fluidic jet means and providing a second pneumatic signal when said movable member is in a second one of its said positions and displaced away from such a pneumatic jet, and means adapted for fluidly coupling said fluidic jet means to said control valve to transmit said pneumatic signals thereto.

2. The pressure-responsive control apparatus of claim 1 wherein said pressure-sensing means include an enclosed housing, a diaphragm operatively arranged in said housing and defining first and second pressure chambers therein on opposite sides of said diaphragm, and first and second means adapted for respectively communicating pressures to said first and second chambers; and further including means coupling said movable member to said diaphragm for moving said movable member between its said positions in response to movements of said diaphragm.

3. The pressure-responsive control apparatus of claim 1 wherein said pneumatic-signaling means further include: second fluidic jet means adapted to direct a second pneumatic jet across said predetermined path of said movable member for providing a third pneumatic signal when said movable member is in one of its said positions and impinged by a pneumatic jet issuing from said second fluidic jet means and providing a fourth pneumatic signal when said movable member is in another of its said positions and displaced away from said second pneumatic jet; and second means adapted for fluidly coupling said second fluidic jet means to said control valve to transmit said third and fourth pneumatic signals thereto.

4. The pressure-responsive control apparatus of claim 3 wherein said one position of said movable member is its said second position and said other position of said movable member is its said first position.

5. The pressure-responsive control apparatus of claim 3 wherein said pressure-sensing means include an enclosed housing, a diaphragm operatively arranged in said housing and defining first and second pressure chambers therein on opposite sides of the diaphragm, and first and second means adapted for respectively communicating pressures to said first and second chambers; and further including means coupling said movable member to said diaphragm for moving said movable member between its said positions in response to movements of said diaphragm.

6. The pressure-responsive control apparatus of claim 5 wherein said movable member has first and second portions respectively extending outwardly from said opposite sides of said diaphragm, said first fluidic jet means are directed toward said predetermined path of said first portion of said movable member, and said second fluidic jet means are directed toward said predetermined path of said second portion of said movable member.

7. The pressure-responsive control apparatus of claim 6 wherein said one position of said movable member is its said second position and said other position of said movable member is its said first position.